J. B. WILLIAMS.
LEAK DETECTOR.
APPLICATION FILED JULY 27, 1908.

932,079.

Patented Aug. 24, 1909.

WITNESSES:
J. Herbert Bradley.
Charles Barnett

INVENTOR
Joseph B. Williams,
by Christy & Christy, Atty's

UNITED STATES PATENT OFFICE.

JOSEPH B. WILLIAMS, OF CORAOPOLIS, PENNSYLVANIA.

LEAK-DETECTOR.

932,079.

Specification of Letters Patent.　Patented Aug. 24, 1909.

Application filed July 27, 1908. Serial No. 445,544.

*To all whom it may concern:*

Be it known that I, JOSEPH B. WILLIAMS, residing at Coraopolis, in the county of Allegheny and State of Pennsylvania, a citizen of the United States, have invented or discovered a certain new and useful Improvement in Leak-Detectors, of which improvement the following is a specification.

The invention described herein relates to certain improvements in means for detecting leaks and consists generally stated in an indicator arranged in a part of the vessel frequented by some of the crew and operated by fluid pressure produced by water leaking into the hold of the vessel.

The invention is hereinafter more fully described and claimed.

Figure 1:
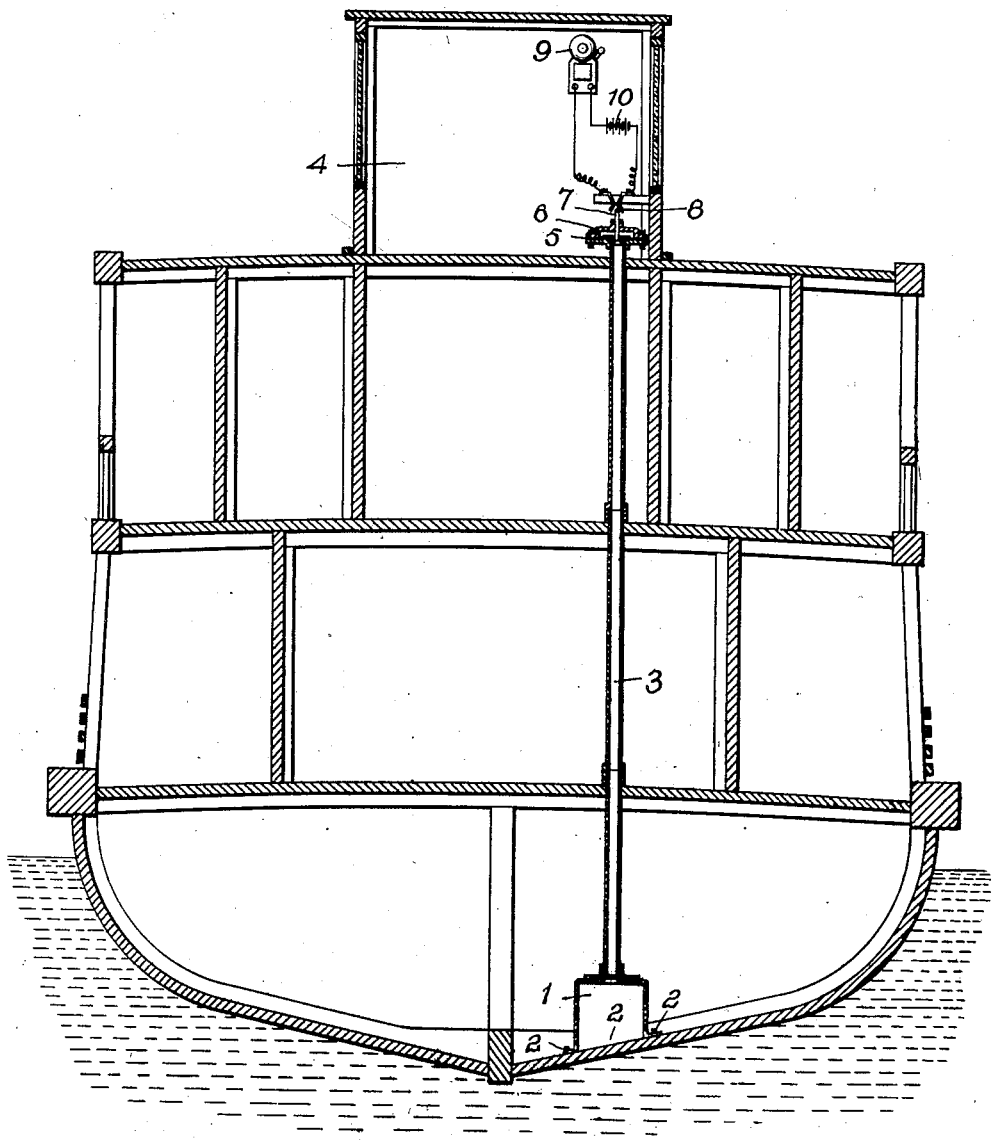
Figure 2:
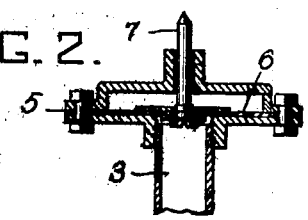

In the accompanying drawing forming a part of this specification Figure 1 shows in section the hull of a vessel having my improved indicator arranged therein, and Fig. 2 is a sectional view on an enlarged scale of a portion of the apparatus.

In the practice of my invention an indicator is arranged at one or more suitable points in the boat, as in the pilot house 4. The indicator is preferably an electrically operated bell 9 having in its circuit a battery 10 and normally separated contacts 8. The contacts are adapted to be electrically connected by a pin 7 carried by a flexible diaphragm 6 secured in a shell 5 preferably formed of oppositely arranged concave metal disks. This shell is connected on the side of the diaphragm opposite that through which the pin 7 projects, to a pipe 3 extending down into the hold of the vessel, its lower end being so located as to be covered in case any material amount of water collects in the hold. It is preferred that the lower end of the pipe 3 should connect with a chamber formed by a metal shell or drum constructed to permit a rapid inflow of water. When an open bottomed vessel is employed, it is raised a short distance from its support by feet 2. As will be readily understood, the rising of water around and in the lower end of the pipe 3 or chamber 1 will effect a compression of air trapped in the pipe or chamber by the rising water. By employing a diaphragm to transmit the movement of the air in the tube or translate any increase of pressure into movement, all packing and frictional resistance due thereto is avoided. And by making the area of the diaphragm large relative to the delivery area of the pipe, a small increase of pressure in the pipe and shell 5 will cause a movement of the diaphragm. And further in order to insure a movement of the pin 7 by a small movement of the diaphragm, the area of the rigid but light plate 6 secured to the middle portion of the diaphragm, is made comparatively large. It is found that when the apparatus is constructed substantially as described, a very small submergence of the lower end of the pipe 5 will operate the indicator.

Floats arranged in cages have heretofore been employed to detect leaks but the operation of the float is uncertain as it may become jammed by dirt floating in the water. In my device it would be practically impossible to so close the openings in the chamber that sufficient water to lift the diaphragm would not flow in. It is characteristic of my device that there are not any parts concealed in the hold that would be liable to become inoperative.

I claim herein as my invention:

1. A leak detector comprising a shell inclosing a diaphragm, a plate of relatively large area upon said diaphragm, an alarm controlled by said diaphragm, and an airtight connection between said shell and the space wherein the leak is to be detected.

2. A leak detector comprising a shell inclosing a diaphragm, a plate of relatively large area upon said diaphragm, an alarm controlled by said diaphragm, a box or chamber having ports for the admission of water and adapted to be secured where the leak is to be detected, and an air-tight connection between the shell and the box, substantially as set forth.

In testimony whereof, I have hereunto set my hand.

JOSEPH B. WILLIAMS.

Witnesses:
CHARLES BARNETT,
FRANCIS J. TOMASSON.